June 11, 1968  F. KESSELRING  3,388,361
MAGNETIC TRIP STRUCTURE FOR ZERO CURRENT
CIRCUIT INTERRUPTERS
Filed June 28, 1966  2 Sheets-Sheet 1

INVENTOR.
FRITZ KESSELRING
BY
OSTROLENK, FABER, GERB & SOFFEN
ATTORNEYS

INVENTOR.
FRITZ KESSELRING 3,388,361
MAGNETIC TRIP STRUCTURE FOR ZERO
CURRENT CIRCUIT INTERRUPTERS
Fritz Kesselring, Kusnacht, Zurich, Switzerland, assignor to Siemens-Schuckertwerke A.G., Berlin, Germany, a corporation of Germany
Filed June 28, 1966, Ser. No. 561,111
3 Claims. (Cl. 335—281)

This invention relates to zero current circuit interrupters, and more particularly relates to a novel magnetic circuit for delivering a signal to a circuit interrupter operating mechanism just prior to the time that the current through the circuit interrupter is to pass through zero.

Devices of the type to which the invention relates are commonly known as "pre-trip" devices. The present invention is specifically an improvement of the novel pre-trip device described in copending application Ser. No. 441,616 filed Mar. 22, 1965, entitled Magnetic Current Zero Sensing Circuit, now Patent No. 3,313,982 in the name of Seguin, and assigned to the assignee of the present invention, which is hereby incorporated as a part of the present specification.

As described in the above noted application, a novel magnetic pre-trip device is constructed of a magnetic circuit encircling the bus carrying current through the circuit interrupter contacts. This magnetic structure is provided with a winding and has a plurality of internal air gaps, one of which is spanned by a movable armature. This armature is movable to deliver a mechanical operating signal to a circuit interrupter operating mechanism. The holding flux through the armature is then comprised of two magnetic components; the first component being the flux through the magnetic structure encircling the main current conductor, and the second component being derived from the current induced in the winding which is auxiliary to the main conductor and is wound on the magnetic structure.

The combination of these two magnetic fluxes through the armature, as is described in detail in the above noted application, will decrease below the holding flux value of the armature at some time prior to the current zero value through the main conductor carrying the magnetic circuit. Thus, it is possible to deliver a signal by means connected to the armature for initiating the circuit breaker interruption at zero current, or at some time just prior to zero current, known as the pre-trip time.

In the above noted application, the component of flux derived directly from the flux circulating through the magnetic device is taken from one gap of a plurality of series connected gaps. Thus, a magnetic flux divider is provided. It has been found that with this arrangement there is a variation in pre-trip time which is dependent upon the current magnitude in the main conductor. That is, the armature is released at an earlier time for lower currents than for higher currents.

In accordance with the invention, short bridges of magnetic material span each of the air gaps in series with the air gap carrying the armature where these bridges occupy a total width of from 4 to 12% of the width of the air gaps. It has been found that such bridges cause an extremely flat pre-trip time obtained over a wide range of currents. Note that these small bridges will saturate at the higher current value so that they will not distort the operation of the magnetic system at such higher current values.

Accordingly, a primary object of this invention is to increase the accuracy of the pre-trip time of a magnetic pre-trip device for a zero current interrupter structure.

Another object of this invention is to provide a novel magnetic circuit which operates as a pre-trip structure which includes a plurality of air gaps, one of which supplies the magnetic flux for an armature and the others having small bridging regions of magnetic material which occupy from 4 to 12% of the air gap area.

These and other objects of this invention will become apparent from the following description when taken in connection with the drawings, in which.

Figure 1:
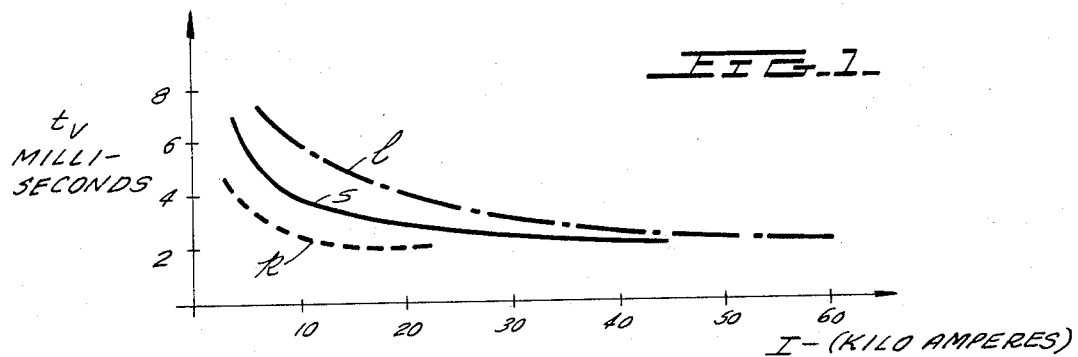
FIGURE 1 illustrates pre-trip time as a function of current for the prior art type of pre-trip device shown in the above noted copending application.

Referring first to FIGURE 1, there is illustrated therein a plot of the time $t_V$ in milliseconds which is the pre-trip time (the time difference between the release of a magnetic armature which can deliver a signal to the operating mechanism of the circuit breaker and the time at which current to be interrupted passes through zero) plotted as a function of the current $I_1$ which is the current through the interrupter contacts.

FIGURE 1 shows three curves for different types of interrupting duty. Thus, the curve $s$ illustrates the operation of the system on a symmetric fault, while curves $l$ and $k$ illustrate the operation of the system for major and minor loops, respectively.

It will be noted that the pre-trip time is not the same over the current range, but that it is longer for lower current magnitudes, and begins to flatten out only after approximately 20,000 amperes.

It will be apparent that it is desirable to obtain as flat as possible a pre-trip characteristic over the entire current range so that there will be lower interrupting duty requirements required of the interrupter in the high current regions having a short pre-trip interval. To this end, the structure described in the above noted copending application has been modified as illustrated in FIGURES 4 and 5.

Figure 4:
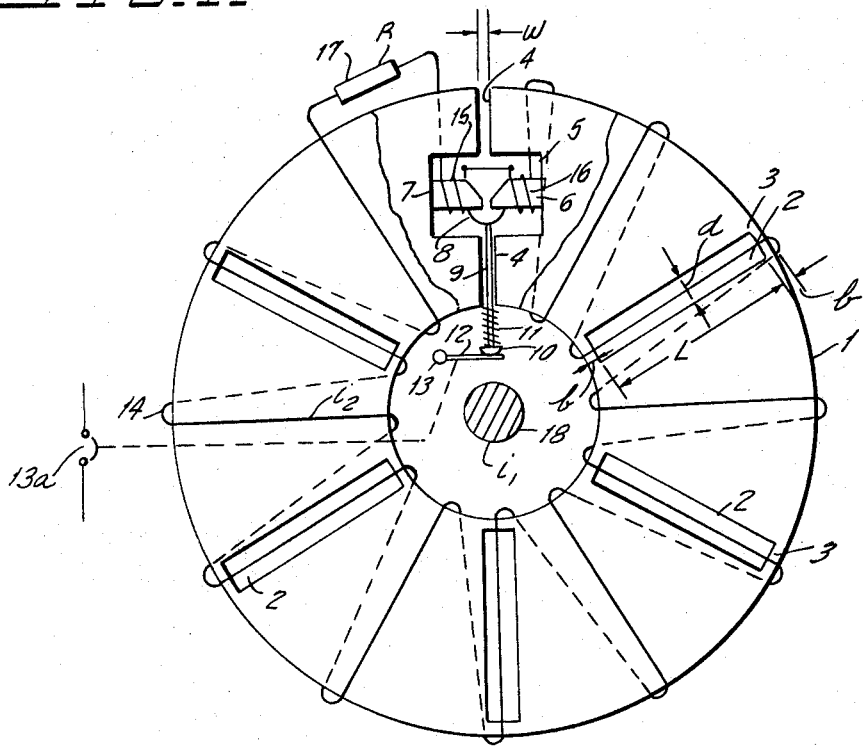
FIGURE 4 is a cross-sectional view of the novel magnetic pre-trip circuit, taken across the line 4—4 in FIGURE 5.
Figure 5:
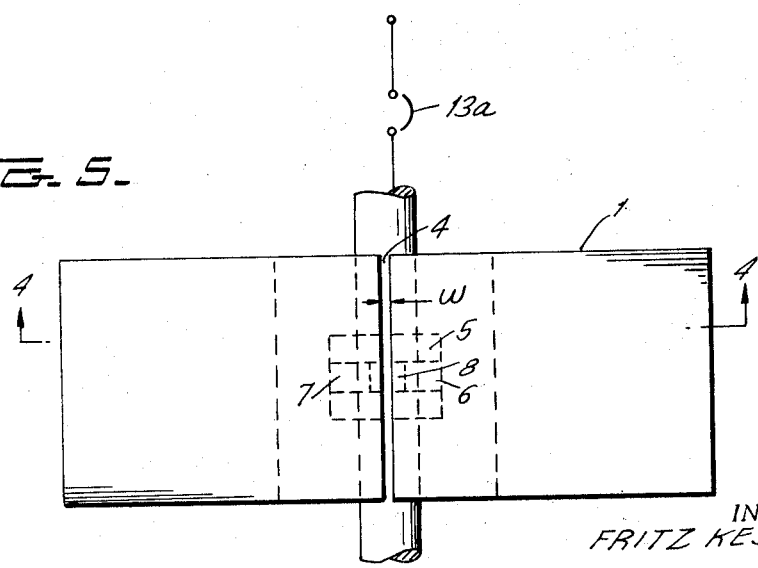
FIGURE 5 is a top view of FIGURE 4.

Referring now to FIGURES 4 and 5, the main magnetic body 1 is formed of a stack of magnetic laminations having interposed therein air gaps 2 which have a width $d$. Five such air gaps are illustrated in FIGURE 4. In accordance with the invention, each of air gaps 2 are bridged at their inner and outer ends by bridges 3 having a width $b$. A non-bridged air gap 4 is then provided which has a width $w$, which air gap intercepts a cavity 5, as illustrated.

Pole shoes 6 and 7 extend toward one another from opposite sides of the cavity and are separated at their ends by a distance equal to the width $w$ of air gap 4. Note that poles 6 and 7 can be secured within the cavity 5 in any desired manner and could, for example, be extensions of the respective laminations having a suitable cutout shape defining the cavity 5 and the poles 6 and 7.

A magnetic armature 8 then spans across the gap between poles 6 and 7, as shown, and is fixed to a movable trip rod 9 which has a lower head 10. The trip rod 9 may be guided in any desired manner (not shown) and is movable perpendicular to the axis of magnetic circuit 1.

A biasing spring 11 is then adapted to bias rod 9 downwardly and toward engagement with lever arm 12 which is secured to a rotatable shaft 13. The lever arm 12 (or shaft 13) is then operatively connected, as illustrated by dotted lines, to the circuit interrupter 13a, whereby when lever arm 12 rotates clockwise, it will automatically cause the operation of the circuit interrupter 13a, with the pretrip time of the system being so arranged that interrupter 13a will interrupt just prior to a current zero value.

An auxiliary winding 14 having $n_1$ turns is then wound on magnetic system 1, while two coils 15 and 16 are wound on poles 6 and 7 and are connected in series with one another. Coils 15 and 16 are also connected in series with resistor 17 which has some particular ohmic value R, and the series connection is continued to include coil 14 which is wound in a polarity opposite to the polarity of windings 15 and 16.

The magnetic system is then energized by the current $I_1$ which flows through the conductor 18 which is connected in series with the interrupter 13a, schematically illustrated in FIGURE 5.

The major distinction between the structure of FIGURES 4 and 5 and that described in the above noted copending application lies in the use of the bridges 3 at the opposite ends of air gaps 2. Preferably, the total area of these bridges for each air gap is from 4 to 12% of the total air gap area, and particularly about 8% of the total air gap area. Note that it is possible to obtain this bridging area by arrangements other than that shown in FIGURE 4. The arrangement of FIGURE 4 is desirable, however, since the bridges occur at the inner and outer ends of the laminations to permit the stamping of a single lamination to simplify the fabrication of the magnetic structure.

The major effect of this novel construction is that the field intensity available in air gap 4 will now be related to the ratio of the reluctance of air gap 4 to the total reluctance of the magnetic circuit. Note that if the magnetic bridges were not provided, the magnetic intensity at air gap 4 would be equal to the ratio of the width of air gap 4 to the width of the sum of all of the air gaps in the circuit.

Figure 2:
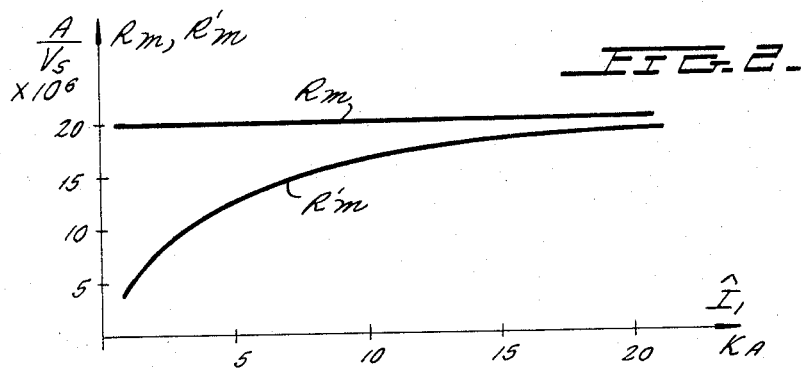
FIGURE 2 illustrates the reluctance of the prior art type pre-trip circuit as compared to the reluctance of the present pre-trip circuit when plotted against current.

FIGURE 2 illustrates the reluctance $R_m$ of the prior art structure as compared to the reluctance $R'_m$ of the present invention. In the prior art where the air gaps extended completely across the magnetic circuit, the reluctance was constant over the entire current range, whereas with the present invention, the provision of the small bridging strips causes the reluctance to be substantially lower in the lower current ranges and gradually increases until it begins to level off due to the saturation of these bridges in the higher current regions. That is to say, at low current, most of the flux flowing across the magnetic circuit including the air gaps will flow through the bridges which have not yet become saturated. Therefore, the reluctance of the entire circuit will appear to be of the shape shown by the curve $R'_m$.

Figure 3:
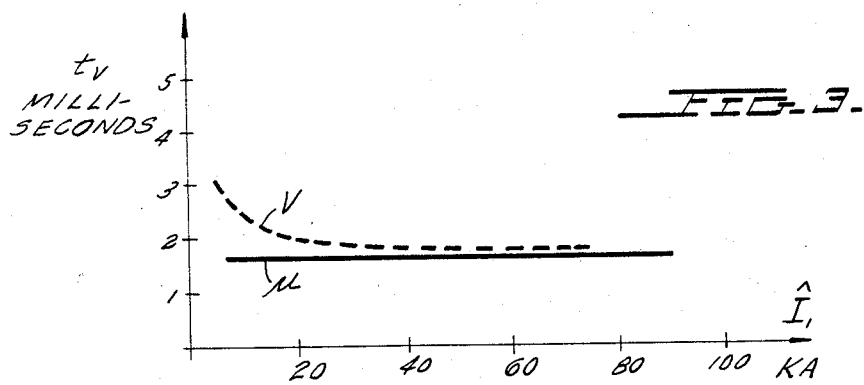
FIGURE 3 illustrates pre-trip time as a function of current when using the novel pre-trip circuit of the invention.

FIGURE 3 illustrates the results obtained from the novel structure as compared to the results of FIGURE 1 where the pre-trip time is plotted as curve $u$ (for the case of a symmetrical loop) where the total radial width of the magnetic structure was 66.8 mm., while the bridges had a length of 2.6 mm. on either side of the air gap. When these bridges were reduced to a width of 1 mm., the curve $v$ resulted where it is seen that there is a distinct rise in the pre-trip time in the lower current regions. Note that if the bridges are entirely removed, the curve $s$ of FIGURE 1 would be obtained.

Figure 6:
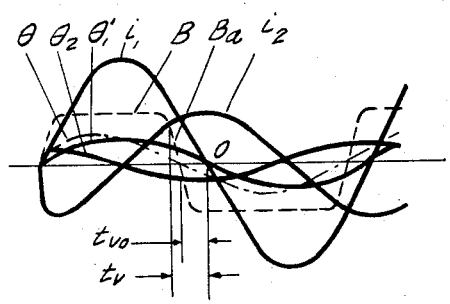
FIGURE 6 illustrates the various magnetic parameters and various currents plotted against a common time base to illustrate the operation of the pre-trip structure of FIGURES 4 and 5.

In all other respects, the operation of the structure of FIGURES 4 and 5 will be identical to that of the above noted copending application, whereby, as shown in FIGURE 6, the armature 8 will carry two components of magnetic flux; the first being derived from the magnetic flux circulating about the magnetic circuit 1, and the second being derived from windings 15 and 16.

More particularly, the magnetic intensity $\theta'_1$, shown in FIGURE 6, is the component of magnetic intensity appearing across air gap 4 and is in phase with the main current $I_1$. A second current $I_2$ is induced in coils 15 and 16 which have a total number of turns $n_2$, with this current giving rise to a second magnetic intensity $\theta_2$ which is equal to $n_2 \times I_2$. Because of the air gaps 2 in the main magnetic system and because of a relatively high ohmic value R of resistor 17, the current $I_2$ lags the current $I_1$ by almost 90% so that the flux component $\theta_2$ will also lag the current $I_1$ by almost 90°. Thus, by appropriately dimensioning the various air gaps, the numbers of turns in the various windings and the resistance of resistor 17, the magnetic field through armature 8, which is produced by the resultant magnetic potential $\theta$, may pass through zero at some predetermined time $t_{vo}$. Moreover, if the components 6, 7 and 8 of the magnetic circuit are arranged to saturate at a relatively small flux density, the magnetic armature 8 will begin to release at a drop-off flux density $B_a$ at a time $t_v$ which is only slightly longer than time $t_{vo}$. Moreover, as soon as armature 8 has separated from poles 6 and 7, the magnetic holding force will drop off at practically zero and the armature 8 will be accelerated by spring 11 toward the lever arm 12 to operate the circuit interrupter 13a.

Since the total reluctance will then be much smaller at smaller currents, as illustrated in FIGURE 2 by reluctance $R'_m$, the magnetic intensity $\theta'_1$ created by current $I_1$ becomes correspondingly higher in the lower current ranges, thereby resulting in a decrease in the pre-trip time.

In constructing a magnetic device yielding the characteristic curve $u$ of FIGURE 3, a total iron cross-section was used of 51 cm.² Eleven air gaps were symmetrically disposed in the magnetic circuit, each having a width of 3.4 mm., and a length of 66.8 mm. Air gap 4 had a width of 0.7 mm. The total width of the bridges for the other gaps was 5.2 mm. symmetrically disposed at either end of the gap.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A magnetic trip structure for a circuit interrupter; said magnetic trip structure comprising a magnetic structure encircling a current conductor connected to said circuit interrupter; a plurality of circumferentially spaced radial air gaps extending through said magnetic structure; one of said air gaps extending through a cavity in said magnetic structure; said cavity containing a pair of spaced magnetic poles and an armature spanning across said poles; said pair of poles and said armature being magnetically in parallel with said one of said air gaps; first winding means wound on said pair of magnetic poles; second winding means wound on said magnetic structure; said first and second windings connected in series with opposing polarities; and magnetic bridge means connected across each of the other of said plurality of air gaps; each of said magnetic bridge means occupying from 4 to 12% of the total area of their respective air gaps.

2. The device as set forth in claim 1 wherein said magnetic bridge means occupy about 8% of the total area of their said respective air gaps.

3. The device as set forth in claim 1 wherein said magnetic structure is comprised of a stack of disk-shaped magnetic laminations; said air gaps defined by aligned radial slots in each of said laminations; said radial slots bridged at their outer and inner ends; the total radial length of said bridges at the inner and outer ends of said slots being from 4 to 12% of the total radial thickness of said laminations whereby said bridges define said magnetic bridge means.

References Cited
UNITED STATES PATENTS 3,215,866  11/1965  Kesselring et al. _____ 307—133
3,299,377   1/1967  Circle et al. _____ 335—19

BERNARD A. GILHEANY, *Primary Examiner.*

G. HARRIS, Jr., *Examiner.*